June 3, 1969  B. V. BARLOW  3,447,852
SCANNING APPARATUS

Filed Dec. 21, 1965  Sheet 2 of 4

BORIS VICTORIEN BARLOW - Inventor

Hall, Pollock & Vande Sande -
Attorneys

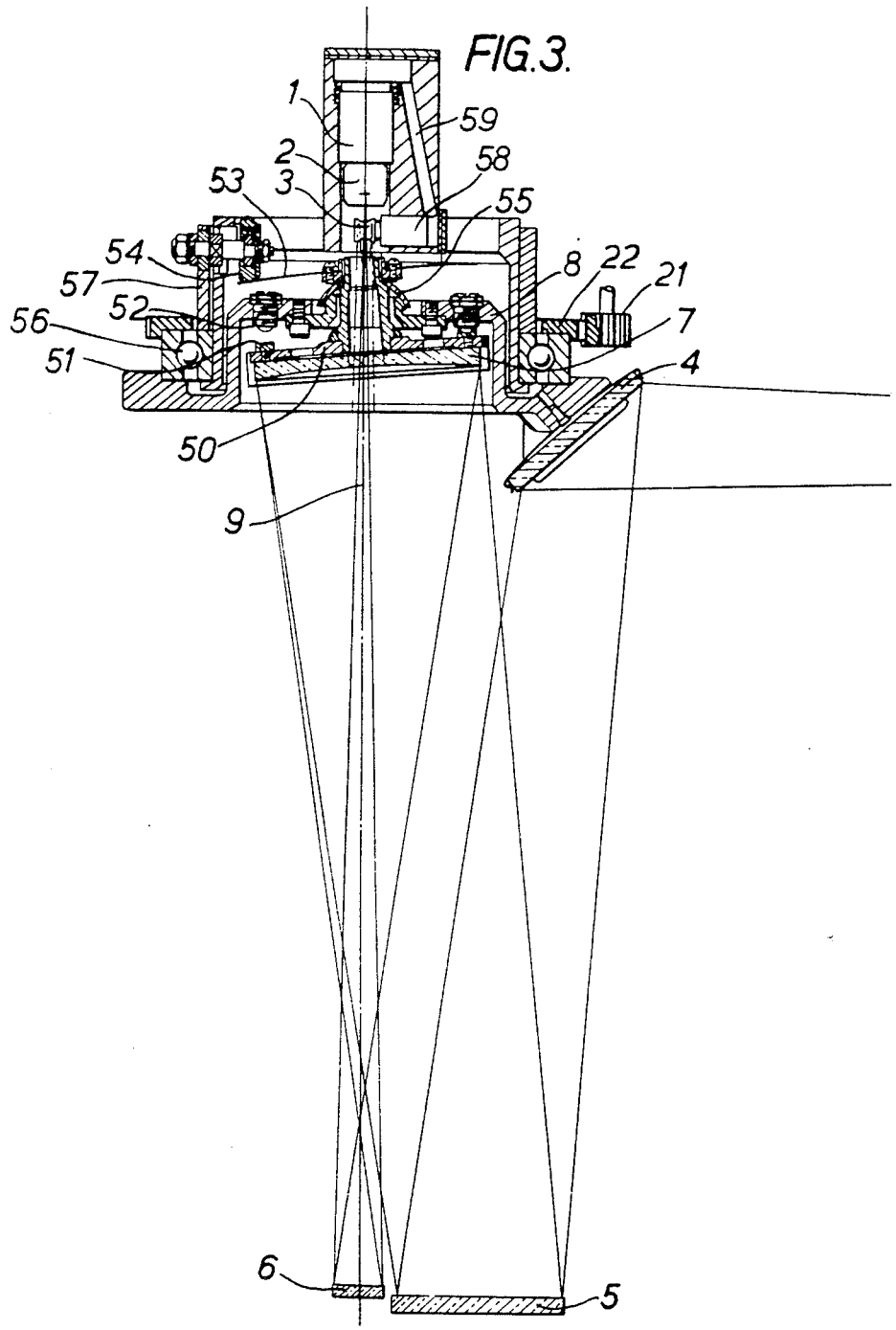

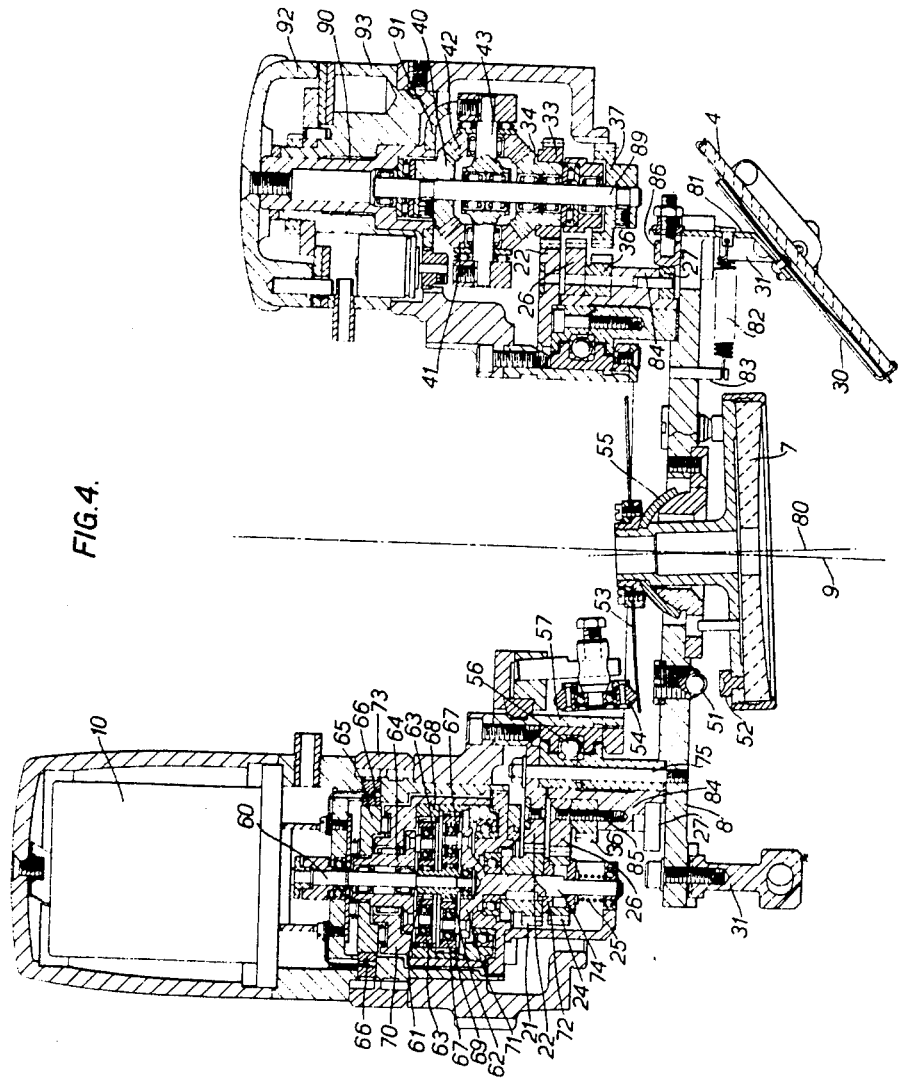

United States Patent Office 3,447,852
Patented June 3, 1969

3,447,852
SCANNING APPARATUS
Boris Victorien Barlow, Edgware, England, assignor to S. Smith & Sons (England) Limited, London, England, a British company
Filed Dec. 21, 1965, Ser. No. 515,364
Claims priority, application Great Britain, Jan. 2, 1965, 200/65
Int. Cl. G02b 27/18
U.S. Cl. 350—7                                          8 Claims

ABSTRACT OF THE DISCLOSURE

Scanning apparatus designed to scan a target, e.g. a human being, having a sensor device and a plurality of plane mirrors mounted for rotation about the path along which the radiation must reach the sensor. The plane mirrors are sequentially opeartive and reflect the radiation from an elemental area of the target onto a concave mirror having a hole through which the said path passes, the concave mirror facing away from the sensing device. This concave mirror reflects the radiation onto a fixed concave mirror which has its axis colinear with the said path, which faces the sensor and which reflects the radiation along the said path. The first-mentioned concave mirror is disposed with its axis at a small angle to that of the path and rotates with the rotatable member. As each of the plane mirrors begins its scan the first-mentioned concave mirror is tilted to a particular angular position and remains in the same angular relationship with that plane mirror as that plane mirror performs its scan.

---

This invention relates to scanning apparatus, that is to say to apparatus comprising a sensing device sensitive to incident radiation and means for scanning a target which emits radiation and for focussing the energy emitted from successive elemental areas of the target onto the sensing device. The output of the sensing device is fed to a display device, e.g. a recorder, on which is formed a "picture" showing the variations in the intensity of the radiation from the parts of the target. Scanning apparatus may be used to scan the human body and in this case the sensing device may be an infra-red detector responsive to the thermal energy emitted by the human body. The "picture" which is then displayed shows the variations in skin temperature over the part of the body which is scanned.

According to this invention scanning apparatus comprises a sensing device disposed so as to be sensitive only to radiation which reaches it along a predetermined fixed path, a member rotatable about the said path, a motor for rotating the member, at least two mirrors mounted on the member, and a further mirror, the disposition of the mirrors being such that in use energy radiated by a target is reflected by one and only one of the mirrors mounted on the member directly or indirectly onto the further mirror and is reflected thereby along the said path, the mirror mounted on the member which reflects the energy changing sequentially as the member rotates.

In use at any given time, the radiation from an elemental area of the target is focussed onto the sensing device and as the member rotates, the elemental area moves across the target so that a line of the target is scanned.

Preferably, the mirrors mounted on the member are simultaneously tilted about axes lying in a plane transverse to the said path as the member rotates, so that the elemental area is moved by the tilting in a direction normal to that in which it is moved by the rotation of the member.

With this arrangement each line of the target scanned by a mirror is parallel to and to one side of the preceding line of the target which was scanned. If each line is closely adjacent to or slightly overlaps the preceding line, the whole target may be scanned.

In a preferred arrangement, the mirrors mounted on the member reflect the radiation directly or indirectly onto a further mirror which has a hole through which the said fixed path passes, which reflects the radiation onto the fixed mirror and which lies in a plane such that its axis is at an angle to the fixed path.

It is preferred that the radiation is reflected directly by the further mirror onto the fixed mirror.

In a convenient arrangement, the further mirror and the fixed mirror are both concave mirrors and serve to focus the radiation onto the sensing device.

Preferably the path of the radiation from the target to the mirrors mounted on the member is substantially at right angles to the said fixed path, the radiation being reflected by the mirrors mounted on the member along a path at relatively small angle to the fixed path onto a flat mirror adjacent to the said fixed mirror, and radiation being reflected by the flat mirror onto the further mirror.

It is desirable that the axis of the further mirror should rotate about the fixed path together with the mirrors mounted on the member, but it must be ensured that the position of the axis of the further mirror is the same whenever a mirror mounted on the member begins to reflect radiation from the target onto the further mirror.

According to a feature of this invention the member has at least three mirrors mounted on it, the further mirror is attached to a holder which is supported by the member in a spherical bearing and the apparatus is provided with a number of pairs of elements, one element of each pair being carried by the holder and the other by the member, each pair forming a pivot which permits no lateral movement when the elements are in engagement with each other, the elements being positioned so that the elements of the pairs engaged as the holder pivots about axes transverse to the said fixed path, and the number of pairs of elements being equal to the number of mirrors mounted on the member, and with means to exert a spring force to the holder at a point fixed in relation to the said fixed path so that the holder takes up a position in which the elements of two of the pairs engage.

In use, as the member rotates, the holder and the further mirror rotate with it because the engagement of the elements of the pairs prevents relative rotational movement. The holder pivots about one of the engaging pairs of elements, the elements of the other engaging pair separating and the elements of a further pair being brought into engagement whenever the angular position of the holder is moved to the extent that a resultant moment is exerted on the holder about the one of the pairs of engaging elements.

The holder pivots a number of times during each rotation of the member equal to the number of pairs of elements. During the rotation of the holder, the axis of the further mirror rotates about the said fixed path, and assuming the elements are symmetrically disposed about the said fixed path during each pivoting of the holder, the axis of the further mirror is brought back to a datum position.

According to another feature of this invention, the apparatus comprises a multi-lobe cam counted for rotation about the said fixed path and arranged to be driven by the motor at a speed different to that of the member, and a number of cam followers equal to the number of mirrors carried by the member, each cam follower being arranged to engage a lobe and one of the mirrors so that in use, the mirrors are simultaneously and similarly tilted.

Preferably the cam followers are integral with or are connected to holders for the mirrors carried by the member.

It is preferred that the input members of a differential gear should be driven by or simultaneously with, the cam and the member respectively, the position of the output member of the differential gear being an indication of the angular position of the mirrors mounted on the member.

Preferably, a spring loaded friction clutch is provided in the drive to either the member or the cam, and means are provided to limit the motion of the output member of the differential gear, the friction cluch slipping when movement of the output member of the differential gear is prevented.

Scanning apparatus designed to scan the human body and constructed in accordance with this invention will now be described with reference to the accompanying drawings of which:

FIGURE 3 shows a sectional elevation of part of the scanning apparatus.

FIGURE 4 shows a sectional elevation of part of a modified scanning apparatus. (Components in FIGURE 3 similar to components in the other three figures have the same reference numerals.)

Figure 1:
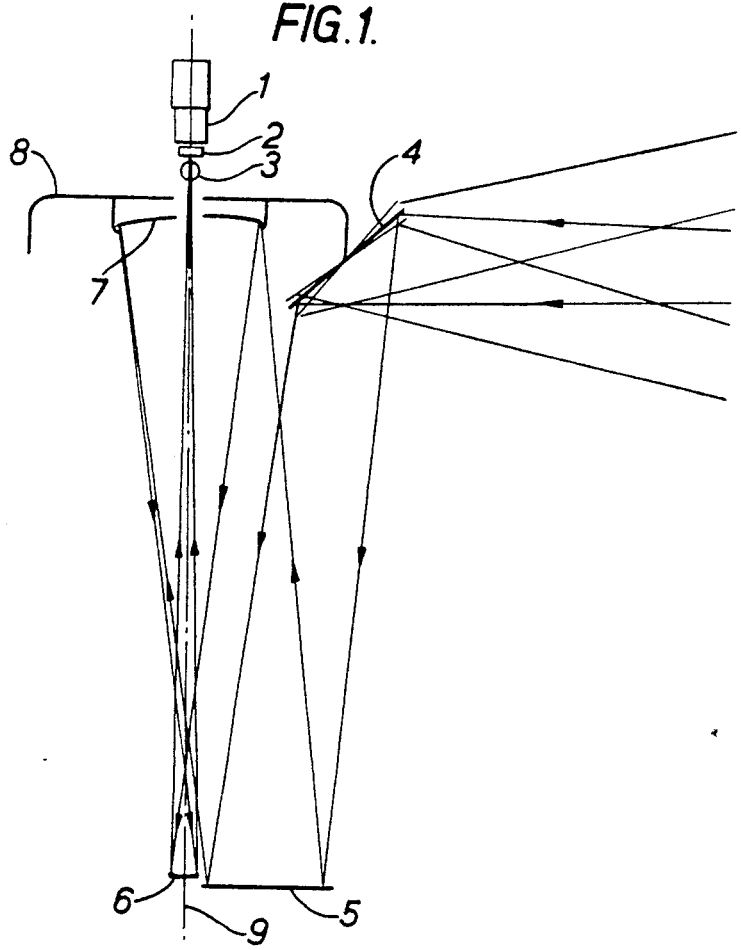
FIGURE 1 is a schematic drawing of the optical system of the apparatus. (The word "optical" in this specification includes energy at frequencies below that of the visible spectrum.

Referring to FIGURE 1, an infra-red detector 1 is disposed so as to be sensitive to energy incident on it along or adjacent to an axis 9. The radiation incident onto the detector passes through an infra-red filter 2 and a chopper 3 which is driven by an air turbine 58 (not shown in FIGURE 1) and chops the radiation at a frequency of 5 kc./s. The detector 1 is cooled with liquid nitrogen and the liquid nitrogen after passing over the detector 1 is permitted to become gaseous and is used to drive the air turbine. A turret 8 disposed below the chopper 3 is mounted for rotation about the axis 9 and carries nine flat mirrors 4 which are symmetrically disposed about the axis 9. Each mirror 4, when in the angular position about the axis 9 shown, reflects radiation from a target onto a flat mirror 5 disposed adjacent to the axis 9 and spaced apart from the turret 8. The rays incident onto and reflected from the mirror 4 are indicated in FIGURE 1 and it will be seen that the incident rays are approximately normal to the axis 9. The rays incident onto the mirror 5 are reflected onto a concave mirror 7 carried by the turret 8 and disposed at a slight angle to the axis 9. The rays are reflected by mirror 7 onto a further concave mirror 6 disposed on the axis 9 at a distance from the mirror 7 which is greater than the focal length of the mirror 7. The mirror 6 focusses the radiation onto the detector 1, the rays passing through central holes in the mirror 7 and the turret 8. The optical system as a whole focusses the energy radiating from a small elemental area of the target onto the detector 1. The turret 8 is rotated at a constant speed about the axis 9 and as it rotates the elemental area moves horizontally across the target so that each mirror 4 scans a line of the target. As the turret 8 rotates, the mirrors 4 successively move to the position in which they are effective to focus radiation from the target onto the detecor 1. Each mirror 4 forms part of the optical system while it is rotated through an angle of 28° about the axis 9. The proportion of time during which radiation is reaching the detector 1 is thus $$\frac{9 \times 28}{360} \times 100 = 70\%$$

The mirrors 4 are all tilted upwards slowly as the turret 8 rotates so that the elemental area moves upwards slowly as it moves horizontally. Thus the line scanned by each mirror 4 is inclined at a small angle to the horizontal and is immediately above the line scanned by the preceding mirror 4.

Figure 2:
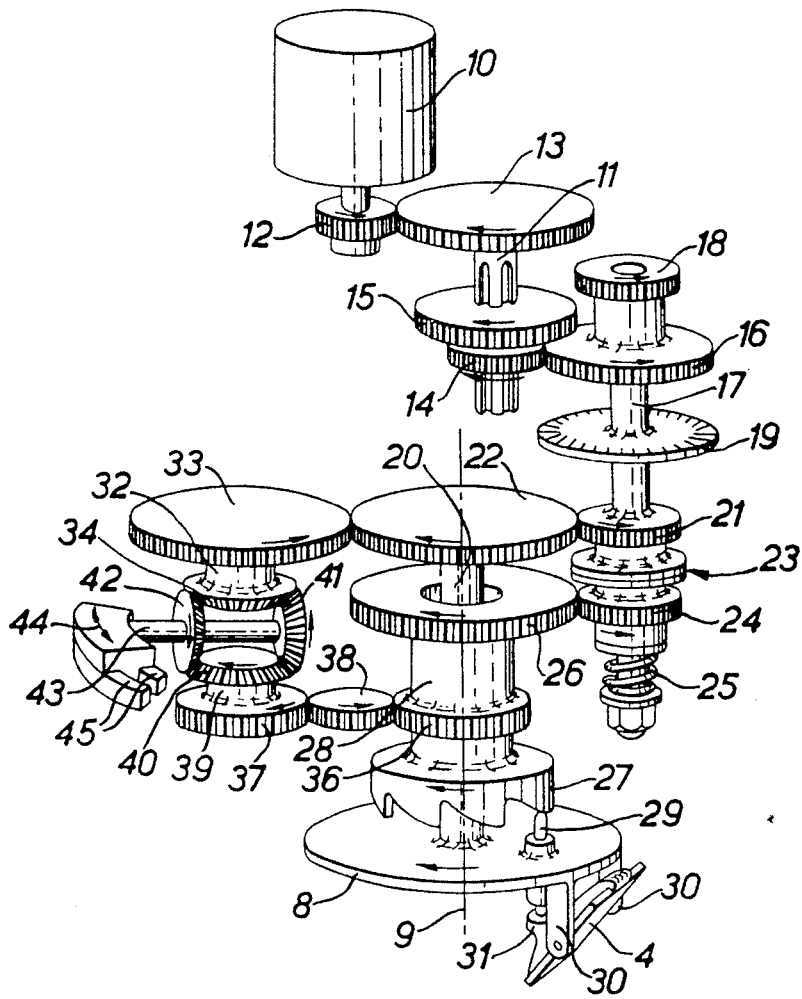
FIGURE 2 shows schematically a drive arrangement for driving and tilting the mirrors shown in FIGURE 1.

The mechanical drive arrangement which rotates the turret 8 and tilts the mirror 4 is shown schematically in FIGURE 2 in which the directions of rotation of the various mechanical components are shown by arrows. A synchronous electric motor 10 drives a shaft 11 through a pair of meshing spur gears 12 and 13. Two gears 14 and 15 of a pair of cluster gears are shown in the position in which the gear 14 engages a gear 16 fixed to a shaft 17 but are movable axially to a position in which the gear 15 engages a gear 18 also fixed to the shaft 17. In the position of the cluster shown the shaft 17 is driven at 72 r.p.m. and in the position of the cluster in which the gear 15 engages the gear 18, the shaft 17 is driven at 600 r.p.m. The shaft 17 carries a disc 19 which is generally transparent but is marked with opaque lines. Two lamps and two photo-electric cells (not shown) co-operate with the lines to produce two A.C. signals with a 90° phase difference between them. The A.C. signals are used to drive the motor of the recorder in a manner described later. The shaft 17 drives a shaft 20 rotatable about the axis 9 through a pair of meshing spur gears 21 and 22, the gear 21 having sixteen teeth and the gear 22 having one hundred and forty-four teeth. The shaft 20 carries directly the turret 8. The shaft 17 also carries one plate of a friction clutch 23, the other plate being rotatably mounted on the shaft 17 and fixed to a spur gear 24. The plates of the clutch 23 are urged into engagement with each other by a spring 25. The spur gear 24 which has sixteen teeth engages a spur gear 26 which has one hundred and forty-three teeth and is carried by a sleeve 28 which surrounds the shaft 20 and is rotatable about the axis 9. The sleeve 28 carries at its lower end a cam 27 having nine lobes, each lobe being in engagement with the upper end of a pin 29. The turret 8 carries the mirrors 4 (only one of the nine mirrors is shown) in trunnions 30 so that they are rotatable about an axis lying in a plane transverse to the axis 9. A shaped member 31 is fixed to each mirror 4 and is engaged by the lower end of one of the pins 29, the members 31 being held in engagement with the pins 29 by springs (not shown). The gear 22 engages a similar gear 33 carried by a shaft 32 which is driven in the anti-clockwise direction (as viewed from above) at the same speed as the shaft 20. The shaft 32 carries a bevel gear 34 which is an input gear of a differential transmission and has sixty teeth. The sleeve 28 carries a spur gear 36 which has sixty teeth and which drives a similar spur gear 37 through an idler gear 38. The gear 37 is carried on a shaft 39 which is driven in the clockwise direction at the same speed as the sleeve 28. The shaft 39 carries a bevel gear 40 which is the other input gear of the differential transmission and has sixty teeth. Two similar bevel gears 41 and 42 rotatably mounted on a shaft 43, engage the bevel gears 34 and 40. The shaft 43 carries a block 44 which is constrained by a track 45 so that it can only move in a circular path about the common axis of the bevel gears 34 and 40.

The operation of the mechanical drive arrangement will now be described. The motor 10 drives through the gear train the shaft 17 which rotates at one of its two possible speeds. The shaft 17 drives the shaft 20 through the gears 21 and 22 at one-ninth of its own rotational speed. Each mirror 4 is therefore rotated through one-ninth of a revolution for each complete revolution of the shaft 17. Thus each complete revolution of the shaft 17 corresponds to a complete line of the target scanned by a mirror 4. The signals generated by the photo-electric cells associated with the disc 19 are used to drive the motor of the recorder. The recorder has a stylus which moves across a chart and to which the electric signals generated by the detector 1 are fed after suitable amplification and rectification. The motor of the recorder is arranged to drive the stylus so that it traverses the chart once for every complete revolution of the shaft 17 and therefore for every line scanned by the mirrors 4.

The gear 26, and therefore the sleeve 28, rotates at a very slightly faster speed than the shaft 20 as the gear 26 has one tooth fewer than the gear 22. (This assumes the plates of the clutch 23 are not slipping. The cam 27 thus rotates slowly with respect to turret 8 so that its lobes gradually depress the pins 29 thereby rotating mirrors 4 about their respective axes. It is arranged that the rate of tilt of the mirrors 4 is such that each line of the target scanned by the mirror 4 is immediately above the line of the target scanned by the mirror 4 which it succeeded.

The shafts 32 and 39 rotate in opposite directions at the speeds of the shaft 20 and the sleeve 28 respectively so that shaft 39 and gear 40 rotate at a slightly greater speed than the shaft 32 and the gear 34. The shaft 43 which carries the gears 41 and 42 is rotated about the common axis of the gears 34 and 40. The block 44 therefore moves in the track 45 and its position is an indication of the angular relationship between the mirrors 4 and the trunnions 30. Settable stops (not shown) are provided to limit the movement of the block 44 in the track 45. When the motor 10 rotates with the block 44 in engagement with one of the stops, the shafts 32 and 39 are constrained to rotate at the same speed as are the shaft 20 and the sleeve 28. The gears 21 and 24 are therefore constrained to rotate at slightly different speeds and the plates of the clutch 23 slip. The angular position of the mirrors 4 with respect to the trunnions 30 does not change and the mirrors 4 repeatedly scan the same line of the target. The block 44 may be moved manually in the track 45 in order to rotate the mirrors 4 in their trunnions 30. If the block 44 is moved when the motor 10 is not rotating, the shafts 20 and 32 will not rotate but the shaft 39 and the sleeve 28 are rotated, the plates of the clutch 23 slipping to permit the relative rotation of the gears 21 and 24.

Referring again to FIGURE 1 it will be appreciated that the mirror 7 and its axis must be rotated about the axis 9 together with each mirror 4 as it scans the target. The axis of the mirror 7 must also be in the same position when each mirror 4 begins to scan the target and thus must be brought back to a datum position during the intervals between the time a mirror 4 ends its scan of a line of the target and the succeeding mirror 4 beginning its scan of the next line of the target. The mechanism for effecting this is shown in FIGURE 3.

Referring now to FIGURE 3, for the sake of simplicity, only one mirror 4 is shown, and that mirror is shown as fixed to the turret 8 instead of being mounted in trunnions, furthermore, mirror 6 is shown as a plane mirror. The mirror 7 is carried by a holder 50 which is mounted on the turret 8 but is permitted to move in relation to the turret 8 by a spherical bearing 55. The turret 8 is fixed to the outer race of a ball bearing 56, the inner race being attached to a fixed cylindrical member 57. The member 57 carries a sub-assembly including the detector 1, the filter 2, the chopper 3 and the turbine 58. The gaseous nitrogen flows through a passage 59 to the turbine. The gear 22 is attached to the outer race of the bearing 56. The holder 50 carries on its upper surface nine cups 51 which are symmetrically disposed about the axis of the mirror 7. The turret 8 carries nine steel balls 52 symmetrically disposed about the axis 9 at the same distance from the axis 9 as the cups 51 are from the axis of the mirror and each ball 52 is disposed opposite one of the cups 51. The holder 50 carries above the bearing 55, a circular spring steel disc 53, the upper surface of which engages a roller 54 whose axis is horizontal and which is carried by the member 57. The effect of the engagement of the roller 54 and the disc 53 is to cause the holder 50 to take up a position about the spherical bearing 55 in which two of the cups 51 engage two balls 52. It will be appreciated that there are thus four points at which a force is exerted on the holder 50, the point at which the disc 53 engages the roller 54 and the points of engagement between the cups 51 and the balls 52 and the spherical bearing. As the turret 8 is rotated, the holder 50 (and the mirror 7) rotates so that the position of the point of contact of the roller 54 and the disc 53 changes in relation to the points of engagement of the caps 51 with the balls 52. As the holder 50 rotates the position of the holder 50 eventually becomes unstable and it tilts about the point of engagement of one of the balls 52 with the cup 51 so that the other cup 51 moves out of engagement with the ball 52 with which it was in engagement and the cup 51 on the other side of the cup 51 acting as a pivot moves into engagement with one of the balls 52. During the tilting action the axis of the mirror 7 is altered. In one complete revolution of the turret 8 and the holder 50, the tilting action referred to takes place nine times, the ball 52 and the cup 51 which act as the pivot changing sequentially. At the end of the tilting action referred to, the axis of the mirror 7 is always the same. The tilting action (which is rapid) is arranged to take place just before each mirror 4 begins to scan a line of the target. As each mirror 4 scans a line of the target as it rotates about the axis 9, the axis of the mirror 7 rotates with it so that the relative positions of the mirrors 4 and 7 remain the same. The relative positions of the mirror 7 and each mirror 4 while it scans a line of the target, is always the same. This is necessary to avoid optical aberration.

Referring now to FIGURE 4, part of a modified scanning apparatus is shown. In this view, the detector 1, the filter 2 and the chopper 3 are not shown, nor are the mirrors 5 and 6. The positions of these components are however the same as those in FIGURES 1 and 3. The mirror 7 is shown and its axis is indicated at 80. In the apparatus shown in FIGURE 4 the turret 8 and the cam 27 are driven through a two speed epicyclic gearbox in place of the two speed gearbox employing spur gears shown in FIGURE 2. This epicyclic gearbox will now be described. The motor 10 has an output shaft 60 to which a cluster of two sun gears 61 and 62 is rigidly fixed. The sun gear 61 drives two similar planet gears 63 which are supported by a carrier 64 to which a disc 65 is rigidly fixed. Brake blocks 66 can be brought into engagement with the disc 65 and are manually controlled by a ring 73, the angular position of which is manually adjustable. The two planet gears 63 engage internal teeth of an annulus 68 which is a force fit in a cylindrical member 70. Brake blocks (not visible in FIGURE 4) are provided to brake the cylindrical member 70 and are controlled by the ring 73. It is arranged that the ring 73 is movable between two angular positions in one of which the disc 65 is prevented from rotating and in the other of which the member 70 is prevented from rotating. The sun gear 62 engages two similar planet gears 67 carried by a carrier 71 integral with an output shaft 74. The planet gears 67 engage internal teeth of an annulus 69 which is also a force fit in the member 70. When the member 70 is braked, drive passes from the shaft 60 through the sun gear 62 and the planet gears 67 to the carrier 71 and the output shaft 74. When the disc 65 is braked, the carrier 71 and the shaft 74 rotate in the same direction as when the member 70 is braked but at a very much lower speed. The ratio of the two speeds is greater than 8:1.

The output shaft 74 has fixed to it the gear 21 shown in FIGURE 2, the gear 21 being in engagement with the gear 22 which is annular. The gear 22 is attached by a number of bolts 75 to the outer race of the ball bearing 56 as is the turret 8. The shaft 74 also carries a ring 72 which carries the gear 24 and which is urged against the gear 21 by the spring 25. The engaging surfaces of the ring 72 and the gear 21 take the place of the friction clutch 23 shown in FIGURE 2. The gear 24 engages the gear 26 which is annular.

The turret 8 and its associated components are similar to the equivalent components shown in FIGURE 3 and only those features which differ will be described. The mirrors 4 are carried by holders 30 which are rotatable in the trunnions 31. Each trunnion 31 is disposed between two of the mirrors 4 and supports the holders of both those mirrors 4. An arm 81 is attached to each holder 30 and a spring 82 is attached to the arm 81 and to a peg 83 carried by the turret 8. The springs 82 urges the mirrors 4 towards their vertical orientations, i.e. the spring 82 shown in FIGURE 4 urges the mirror 4 in the counterclockwise direction. The gear 26 is attached by bolts 85 to a rotatable member 84 as are the gear 36 (also an annular gear) and cam 27. The cam 27 is not a face cam as shown in FIGURE 2 but is an edge cam having nine lobes. Each lobe is engaged by a cam follower 86 secured to one of the arms 81. It will thus be seen that, in use, relative rotation takes place between the cam 27 and the turret 8. The cam 27 therefore moves in relation to the cam followers 86 and each lobe of the cam 27 urges one of the cam followers 86 outwards causing the associated mirror holder 30 to rotate in the clockwise direction against the action of the associated spring 82 the mirrors 4 are thereby tilted. The lobes as they move past the cam followers 86 permit the cam followers 86, under the action of springs 82, to move inwardly toward the axis 9 tilting the mirrors 4 back to the position shown in FIGURE 4.

The differential gear unit shown in the right of FIGURE 4 is similar to that shown in FIGURE 2. The gear 22 meshes with the gear 34 secured to the bevel gear 33. The bevel gear 34 is mounted rotatably on a shaft 89 to which the bevel gear 40 and the gear 37 are secured. The gear 37 is driven by the gear 36 through the idler gear 38 (not shown in FIGURE 4). The two bevel gears 41 and 42 are carried by the shaft 43 in a similar manner to that shown in FIGURE 2. A sleeve 90 rotatable about the axis of the shaft 89 is caused to rotate together with the shaft 43, the motion of the shaft 43 being transmitted through an arm 91. A cap 92 is secured to the sleeve 90, the angular position of the cap 92 being a measure of the angle through which the mirrors 4 have been tilted. The cap 92 and a casing 93 of the differential gear unit carry markings which co-operate to indicate the angles through which the mirrors 4 have been tilted.

I claim:

1. Scanning apparatus for scanning radiation from a target comprising, a sensing device sensitive to radiation which reaches it along a predetermined path, a first concave fixed mirror disposed with its axis generally coincident with the predetermined path and reflecting radiation toward said sensing device, a second concave mirror having an aperture therein, said second concave mirror being disposed so that the predetermined path passes through said aperture and with its axis at a small acute angle to the predetermined path, said second mirror reflecting radiation away from the sensing device, a rotatable member mounted for rotation about the axis of said first mirror, means for rotating the rotatable member mirror means including, a plurality of plane mirrors mounted on the rotatable member, each of said plurality of plane mirrors being mounted so as to be tangential to a circle transverse to and centered on the axis of rotation of said rotatable member, the plane mirrors having their reflective surfaces at an acute angle to said axis of rotation so that radiation from an elemental area of a target reaches only one of the plane mirrors at any one time, said mirror means reflecting said radiation onto said second mirror and thence to said first mirror and thereafter through said aperture onto the sensing device, successive of said plane mirrors in turn reflecting radiation from the target along said predetermined path and onto said sensing device upon rotation of said rotatable member.

2. Apparatus as claimed in claim 1 wherein the plane mirrors are individually rotatable also about axes lying in a plane transverse to said axis of rotation and further including tilting means coupled to said rotating means for simultaneously tilting said plane mirrors about said axes.

3. Apparatus as claimed in claim 1 wherein the plane mirrors surround said second mirror, and which said means comprises a third mirror disposed adjacent to said first fixed mirror and with its reflective surface generally parallel to the reflective surface of said first mirror, the radiation reaching the second mirror from the plane mirrors after reflection by said third mirror.

4. Apparatus as claimed in claim 1 wherein there are at least three plane mirrors, and which further comprises a holder to which the second mirror is attached, a universal bearing through which the holder is supported by the rotatable member, a plurality of pairs of elements equal in number to the plane mirrors, one element of each pair being carried by the holder and the other by the rotatable member in alignment with an individual one of the plane mirrors, the elements carried by the holder being in alignment with those carried by the rotatable member, each pair forming a pivot which permits no lateral movement when the elements are in engagement with each other, and means for exerting a spring force on the holder at a point fixed in relation to the predetermined path so that the holder takes up a position in which the elements of two of the pairs engage.

5. Apparatus as claimed in claim 2 wherein said tilting means comprise a cam which has a plurality of similar lobes and is mounted for rotation about the predetermined path, a first transmission through which the cam is coupled to the rotating means, a second transmission through which the rotatable member is coupled to the motor, the transmissions having similar but different velocity ratios, and a number of cam followers equal to the number of plane mirrors, each cam follower being in engagement with a lobe of the cam and with one of the plane mirrors are simultaneously and similarly tilted about said axes.

6. Apparatus as claimed in claim 5 which comprises holders to which the plane mirrors are attached, the cam followers being connected to the holders.

7. Apparatus as claimed in claim 5 which comprises a differential gear whose input members are driven simultaneously with the cam and the rotatable member respectively, the position of the output member of the differential gear being an indication of the angular positions of the mirrors mounted on the rotatable member.

8. Apparatus as claimed in claim 7 which comprises a spring loaded friction clutch situated in the drive to one of the rotatable member and the cam, and means for limiting the motion of the output member of the differential gear, the friction clutch slipping when movement of the output member of the differential gear is prevented.

References Cited

UNITED STATES PATENTS

| | | | |
|---|---|---|---|
| 2,653,185 | 9/1953 | Lubcke et al. | 250—235 |
| 2,718,549 | 9/1955 | Mattke. | |
| 2,960,001 | 11/1960 | Dauguet | 350—7 X |
| 2,997,539 | 8/1961 | Blackstone | 350—7 X |
| 2,998,748 | 9/1961 | McClellan | 350—7 X |
| 3,125,625 | 3/1964 | Boardman | 350—6 X |
| 3,139,604 | 6/1964 | Meiners et al. | 350—7 X |
| 3,147,664 | 9/1964 | Gelfand | 350—7 X |
| 3,153,723 | 10/1964 | Weiss | 350—7 X |
| 3,175,459 | 3/1965 | Smith et al. | 350—7 X |

DAVID SCHONBERG, *Primary Examiner.*

PAUL R. GILLIAM, *Assistant Examiner.*

U.S. Cl. X.R.

178—7.6; 250—235